United States Patent
Mikami

(10) Patent No.: US 8,360,481 B2
(45) Date of Patent: Jan. 29, 2013

(54) HOUSING TYPE PIPE JOINT

(75) Inventor: Syuichi Mikami, Kumagaya (JP)

(73) Assignee: Kabushiki Kaisha Riken, Tokyo (JP)

( * ) Notice: Subject to any disclaimer, the term of this patent is extended or adjusted under 35 U.S.C. 154(b) by 558 days.

(21) Appl. No.: 12/493,770

(22) Filed: Jun. 29, 2009

(65) Prior Publication Data

US 2010/0001514 A1   Jan. 7, 2010

(30) Foreign Application Priority Data

Jul. 1, 2008   (JP) ................................. 2008-172364

(51) Int. Cl.
*F16L 17/00*   (2006.01)
(52) U.S. Cl. ......... 285/367; 285/373; 285/419; 285/420
(58) Field of Classification Search .................. 285/367, 285/373, 411, 419–420
See application file for complete search history.

(56) References Cited

U.S. PATENT DOCUMENTS

| | | | | |
|---|---|---|---|---|
| 2,028,182 | A * | 1/1936 | Barnickol, Jr ................ | 285/112 |
| 3,054,629 | A * | 9/1962 | Piatek ............................ | 285/373 |
| 4,861,075 | A * | 8/1989 | Pepi et al. ..................... | 285/112 |
| 5,018,548 | A * | 5/1991 | McLennan ................ | 137/315.23 |
| 5,246,257 | A * | 9/1993 | Kojima et al. ................ | 285/112 |
| 5,758,907 | A * | 6/1998 | Dole et al. .................... | 285/112 |
| 6,076,861 | A * | 6/2000 | Ikeda ............................. | 285/112 |
| 2007/0090646 | A1* | 4/2007 | Dole et al. .................... | 285/413 |
| 2008/0211229 | A1* | 9/2008 | Hagiya ......................... | 285/373 |

FOREIGN PATENT DOCUMENTS

| | | |
|---|---|---|
| JP | 2538261 | 6/1997 |
| JP | 2573880 | 6/1998 |
| JP | 3183507 | 7/2001 |

* cited by examiner

*Primary Examiner* — Aaron Dunwoody
*Assistant Examiner* — Fannie Kee
(74) *Attorney, Agent, or Firm* — Jenkins, Wilson, Taylor & Hunt, P.A.

(57) ABSTRACT

A housing pipe joint (1) for connecting a pair of pipes comprising: a pair of housings (3) each including a housing body (4) and a flange portion (5); fitting portions (4a) located in parallel on an inner surface of the housing body to fit with the pipes (P), each fitting portion including one stepped section (4a3) angled diagonally relative to the center axis line (C); and a positioning member (6) on opposed surfaces of the flange portion, the positioning member engaging with the other positioning member to position the housings at a first or a second position when one housing is rotated on a plane about a symmetric point (Sy); at the first position the distance between the opposed fitting portions is the closest and the pipes are movably coupled; and at the second position the distance is the largest and the pipes are fixedly coupled to the housings.

8 Claims, 7 Drawing Sheets

HOUSING TYPE PIPE JOINT

CROSS-REFERENCE TO RELATED APPLICATION

This application claims the benefit of Japanese Patent Application No. 2008-172364 filed on Jul. 1, 2008, the entire disclosure of which is herein incorporated by reference.

FIELD OF THE INVENTION

The present invention relates to a housing type pipe joint for butt-connecting ends of pipes to be coupled to each other.

DESCRIPTION OF THE RELATED ART

A housing type pipe joint as shown in FIG. 12 is previously known. This housing type pipe joint 100 includes a pair of housings 300 attached to each other. Each of the housings 300 includes a generally semicircular housing body 400, and flange portions 500 that extend radially outward from the both ends of the housing body 400. A pair of pipes P has circumferential grooves Pa formed on their pipe ends, and is butted against each other to form a connecting part. The pair of housings 300 surround and are attached onto this connecting part so as to interpose an annular gasket 600 between the pair of housings 300 and the connecting part. Bolts 800 are inserted into bolt holes formed in the flange portions 500 opposed to each other, and nuts 900 are tightly screwed onto the bolts 800. Thus, the housing type pipe joint 100 surrounds and is attached to the connecting part of the pipes.

As shown in FIG. 13, pawl portions 400a protrude radially inward are formed on the both side parts that extend in the circumference direction of the housing body 400. The pawl portions 400a fit with the grooves Pa of the pair of pipes P to couple the pipes P.

Actually, methods to couple pipes by means of such a housing type pipe joint differ depending on uses and purposes of piping systems. For example, in the case of a piping system in that response is required for fine adjustment in the workmanship or expansion and contraction of pipes due to temperature variation after the workmanship, a method to couple the pipes movably is used by means of a housing type pipe joint.

To achieve this method, the pawl portions 400a are configured so that their width is narrower than the width of the grooves Pa, and the pawl portions 400a are loosely fitted in the grooves Pa. This configuration allows slight relative movement between the pair of pipes P, and slight relative movement between the pipes P and the housing body 400.

Also, in some cases, a piping system is required in that the pipes P are fixedly coupled by means of a housing type pipe joint to restrict axial and circumferential movement of the pipes P. As a housing type pipe joint that provides this fixed connecting method, a technology is disclosed in that pawl portions are configured to be inclined relative to a center axis line of a housing body (Patent Document 1). In this technology, when a pair of housings is opposed to each other to surround the pipes, the pawl portions fit diagonally with annular grooves of the pipes. Accordingly, the pawl portions are retained on side surfaces of the annular grooves. As a result, the housings are firmly coupled to the pipes.

Also, a technology is disclosed in that, after a pair of housings is opposed to each other to surround pipes, the housings are rotated about a center of the housings in the directions opposite to each other (Patent Document 2). In this technology, when the housings are rotated to be twisted relative to each other, an inner rim 13b of one pawl portion 13 opposed to each other contacts the outside surface of an annular groove 41 of a pipe, and an outer rim 13a of the other pawl portion 13 contacts the inside surface of the annular groove 41 of a pipe. Thus, clearance (gap) can be eliminated between the pawl portions and the annular grooves. Accordingly, it is possible to provide rattle-free connecting method.

In addition, a housing type pipe joint is disclosed in that a plug with inclined wall surfaces is detachably attached to meet both the movable pipe-connecting and the fixed pipe-connecting (Patent Document 3). In this technology, the plug is inserted in sockets that open in flange portions (convex portions) of housings, and a bolt is inserted into the flange portions. Thus, a pair of housings (segments) is attached to be offset in the axial direction of pipes so that pawl portions are retained on side surfaces of an annular groove of the pipe. Accordingly, the housings can be firmly coupled to the pipes. Also, in the case when the bolt is inserted into the flange portions (convex portions) without using the plug, the pair of housings (segments) are not offset in the axial direction of the pipes relative to each other. Thus, the pawl portions are loosely fitted in the grooves. Accordingly, the housings can be movably coupled.

[Patent Document 1] Japanese utility model registration No. 2573880 (FIG. 2)
[Patent Document 2] Japanese utility model registration No. 2538261 (FIGS. 2 and 5)
[Patent Document 3] Japanese Patent No. 3183507 (FIGS. 4 and 5)

PROBLEMS TO BE SOLVED BY THE INVENTION

However, in the cases of the housing type pipe joints disclosed in Patent Documents 1 and 2, the housings cannot be movably coupled to the pipes. In these cases, housing type pipe joints suitable for the movable connecting are required to be separately prepared for piping parts when pipes are required to be movably coupled. For this reason, in the workmanship, the both types of housings used for the movable connecting and the fixed connecting are required to be prepared for various sizes. This causes increase of the number of man-hours to safekeep the housings at worksite and reduction of workmanship efficiency. In addition, there is a problem to provide storage space.

Also, the housing type pipe joint disclosed in Patent Document 3 can meet both the movable and fixed connecting, but there are workmanship efficiency problems of a requirement to attach/detach the plug, a requirement to attach the plug to the sockets in the housings in a predetermined orientation, and the like. For this reason, there is a possibility in that the fixed connecting cannot be provided when the plug is attached in a wrong orientation.

The present invention is aimed at solving the above problems. It is an object of the present invention to provide a housing type pipe joint with excellent workmanship efficiency that meets both connecting methods of fixed and movable pipe connecting by itself without an additional member required depending on the types of connecting methods.

SUMMARY OF THE INVENTION

That is, an aspect in accordance with the present invention provides a housing type pipe joint for connecting a pair of pipes that include concave or convex attachment portions on the pipe end, the housing type pipe joint comprising: a pair of housings each of which including a semicircular housing body, a flange portion located on at least an end of the housing body to extend radially outward, fitting portions located in parallel to each other on the inner surface of the housing body to fit with the attachment portions of the pipes, each of the fitting portions extending diagonally relative to a center axis line of the housing body or including at least one stepped section that angles diagonally relative to the center axis line from one end of the fitting portion toward the other end of the fitting portion, and a positioning member arranged on opposed surface of the flange portion wherein the opposed surface faces toward the other of the flange portion when the pair of housings are opposed to each other, the positioning member engaging with the other of the positioning member to position the pair of housings mutually at a first position when one of the pair of housings is rotated on a plane of the opposed surface about a symmetric point of this housing or at a second position when the housing is rotated in the direction opposite to the first position; wherein the pair of housings surround and secure a connecting part of the pair of pipes when the positioning member engage with the other of the positioning member and the flange portion and the other of the flange portion opposed to each other being fastened by a fastener; and when the positioning member engage with the other of the positioning member at the first position, the distance between the fitting portions and the other of the fitting portions opposed to each other is the closest in a pipe axial direction perpendicular to the center axis line of the housing body so that the fitting portions are loosely fitted in the attachment portions and the pair of pipes are movably coupled to the pair of housings; and when the positioning member engage with the other of the positioning member at the second position, the distance between the fitting portions and the other of the fitting portions opposed to each other is the largest in the pipe axial direction so that the fitting portions tightly fit with the attachment portions and the pair of pipes are fixedly coupled to the pair of housings.

The present invention possesses the positioning member engage with the other of the positioning member at the first or second position to position the housings mutually when the pair of housings are rotated about the symmetric point of the housings. In addition, the fitting portions are provided each includes the stepped section that angles diagonally relative to the center axis line from one end of the fitting portion, toward the other end of the fitting portion, and the fitting portions fit with the attachment portions of the pipes.

Thus, the distance between the fitting portions and the other of the fitting portions opposed each other in the pipe-axial direction can be varied only by rotating the housing. Accordingly, when rotating the housing to reduce this distance, the fitting portions can be loosely fitted in the attachment portions of the pipes so that the pair of pipes can be movably coupled to the pair of housings. On the other hand, when the housing is rotated to increase this distance, the fitting portions can be firmly fitted in and tightly fit with the side walls of the attachment portions of the pipes so that the pair of pipes can be fixedly coupled to the pair of housings. In other words, the present invention can meet both connecting methods of the fixed and movable pipe connecting by one type of housing itself without an additional member required depending on the types of connecting methods. Thus, the present invention has excellent workmanship efficiency and the number of the components can be reduced.

Also, in the case of the fitting portions are formed to extend diagonally relative to the center axis line of the housing body, when the housings are opposed to each other, the fitting portions and the other of the fitting portions which opposed to each other intersect mutually so that the ends of the fitting portions opposed to each other already and slightly open and are spaced away from each other. For this reason, the distance between the ends of both the fitting portions in the pipe-axial direction can be large by rotating the housing at a relatively small angle. Thus, the fitting portions can easily tightly fit with the sidewalls of the attachment portions of the pipes to provide the fixed connecting.

In contrast, when the fitting portions are formed in parallel to the center axis line of the housing body, even when the housings are rotated at the same rotational angle in the opposite directions a width Lw in the pipe-axial direction L is the same irrespective of the rotational directions. For this reason, connecting methods cannot be switched according to the rotational directions (in other words, the both rotational directions make the pipes fixedly connected). Even in this case, if rotational angles are different in the forward and reverse directions, it is possible to switch connecting methods of the fixed and movable pipe connecting. However, the contact state and the area of a contact part between the pipe and the fitting portion vary according to the rotational angle. So, when the rotational angles are different, the fitting tightness of the pipe is not uniform. For this reason, to equal the rotational angles in the forward and the reverse directions, the fitting portions are located to extend diagonally relative to the center axis line of the housing body as the present invention.

Preferably, the positioning member includes two or more of concave sections and convex sections alternately arranged and equidistantly spaced along the end of the housing body.

In this embodiment, when the positioning members are opposed to and engage with each other, both the positioning members in upper and lower locations mesh with each other. Thus, the positioning members can have the same shape. On the contrary, for example, if positioning members in the both ends of an upper housing are composed of a pin and positioning members in the both ends of a lower housing are composed of two holes, the positioning members can engage with each other at the first or second position by inserting the pins into the holes. However, in such positioning members, different structures of pins and holes are required. Accordingly, connecting methods using only one type (kind) of common housing cannot be achieved. This causes increase of the number of components and reduction of workmanship efficiency.

In addition, if one positioning member in one end of one housing is composed of a pin and another positioning member in the other end of the one housing is composed of two holes, connecting methods using only one type of common housing can be achieved. However, in this case, when two housings are opposed to each other, it is necessary to adjust their orientation.

Preferably, the positioning member being arranged along an arc line that centers the symmetric point of each of the housings.

In this embodiment, when the housings are opposed to each other so that both the positioning members are opposed to each other, the housing is necessarily rotated along the arrangement direction of the concave and convex sections to allow the concave and convex sections of the positioning members to mesh with each other, in other words, the housing is necessarily rotated about the symmetric point of the housing. Therefore, if one of the housings is displaced in the pipe-axial direction, the concave and convex sections of the positioning members do not mesh with each other. That is, an improper work such as improper attachment where the housings are displaced in the pipe-axial direction can be prevented.

Preferably, the present invention further comprises a first colored area on the part of the opposed surface of the flange portion, wherein the part being exposed when the positioning member engage with the other of the positioning member at the first position.

In this embodiment, when the housing is rotated to the first position, the inner surfaces of upper and lower flange portions are exposed, and the first-colored area on the inner surfaces becomes visible. Accordingly, it can be easily confirmed that the housing is rotated to the first position. As a result, mistakes such as accidental fixed connecting when the pipes are required to be movably coupled can be prevented, for example.

Preferably, the present invention further comprises a second colored area on the part of the opposed surface of the flange portion, wherein the part being exposed when the positioning members engage with the other of the positioning member at the second position.

In this embodiment, when the housing is rotated to the second position, the inner surfaces of upper and lower flange portions are exposed, and the second-colored area on the inner surfaces becomes visible. Accordingly, it can be easily confirmed that the housing is rotated to the second position. As a result, mistakes such as accidental fixed connecting when the pipes are required to be movably coupled can be prevented, for example.

Preferably, the present invention further comprises an indication part on the exterior surface of each of the housings, wherein the indication part indicates a rotational direction toward the first position and/or the second position.

In this embodiment, before rotating the housing, a worker can visually know which direction to rotate the housing. As a result, mistakes such as accidental fixed connecting when the pipes are required to be movably coupled can be prevented.

According to the present invention, excellent workmanship efficiency can be achieved, and both connecting methods of fixed and movable pipe-connecting can be achieved by itself without an additional member required depending on the types of connecting methods.

DESCRIPTION OF THE PREFERRED EMBODIMENTS

Preferred embodiments of the present invention are explained below, however, the present invention is not limited to these description.

Figure 1:
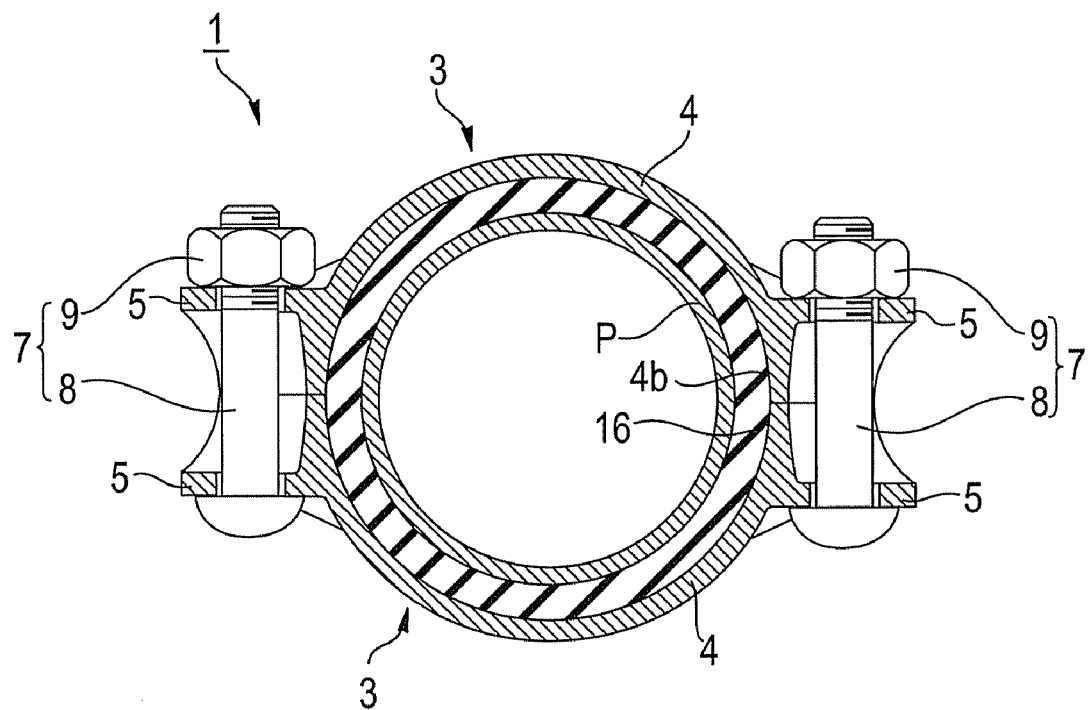
FIG. 1 is a cross-sectional view of a housing type pipe joint according to an embodiment of the present invention taken along a plane perpendicular to the axial direction of pipes.

FIG. 1 is a cross-sectional view of a housing type pipe joint 1 according to a first embodiment of the present invention with being attached to pipes taken along a plane perpendicular to the axial direction of the pipes. The housing type pipe joint 1 includes a pair of housings 3 coupled to each other. Each of the housings 3 includes a generally-semicircular housing body 4, and flange portions 5 that extend radially outward (perpendicularly to the circumferential direction) from the both ends of the housing body 4. A pair of pipes P have later-discussed grooves and are butted against each other to form a connecting part. The pair of housings 3 are opposed to each other to surround this connecting part so as to interpose an annular gasket 16 between the pair of housings 3 and the connecting part. Bolts 8 are inserted into bolt holes formed in the flange portions 5 opposed to each other, and nuts 9 are tightly screwed onto the bolts 8. Thus, the housing type pipe joint 1 surrounds and is attached to the connecting part of the pipes. In addition, the bolt 8 and the nut 9 compose a "fastener."

Figure 2:
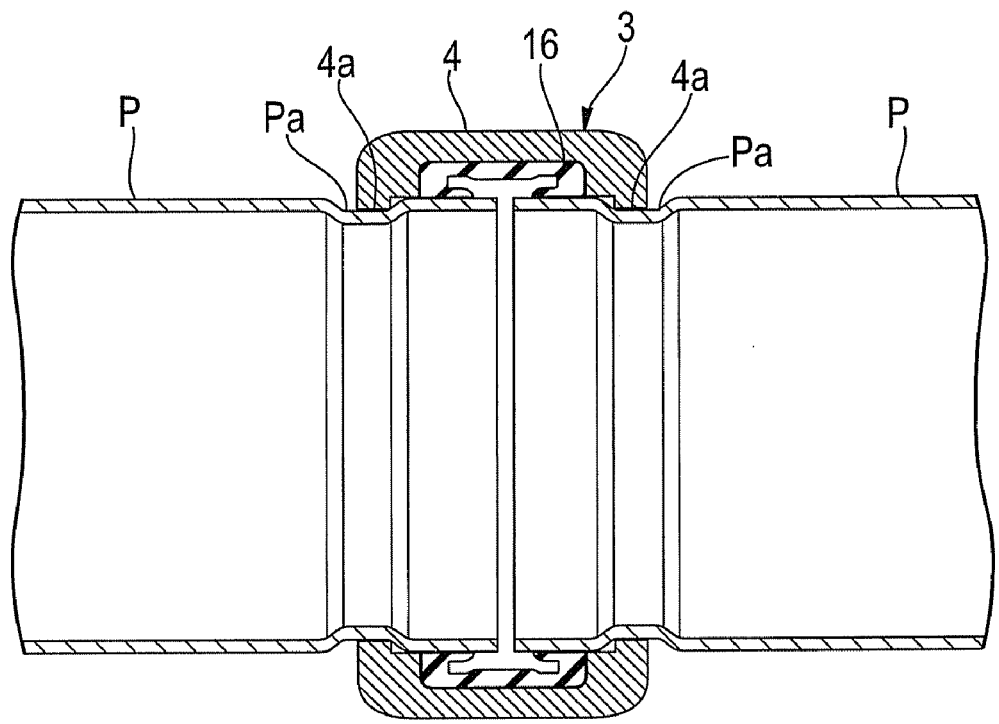
FIG. 2 is a cross-sectional view of the housing type pipe joint according to the embodiment of the present invention taken along a plane parallel to the axial direction of the pipes.

As shown in FIG. 2, a pawl portion (fitting portion) 4a that protrudes radially inward is formed on the inner surface on each of the both side parts that extend in the circumference direction of the housing body 4. This pawl portion 4a fits with a groove (attachment portion) Pa formed in the circumferential direction on each of end of the pair of pipes P to couple the pipes P.

Note that, although the pair of pipes P is substantially coaxially attached to each other, the pipes may be coupled slightly eccentrically or coupled to form an angle.

Figure 3:
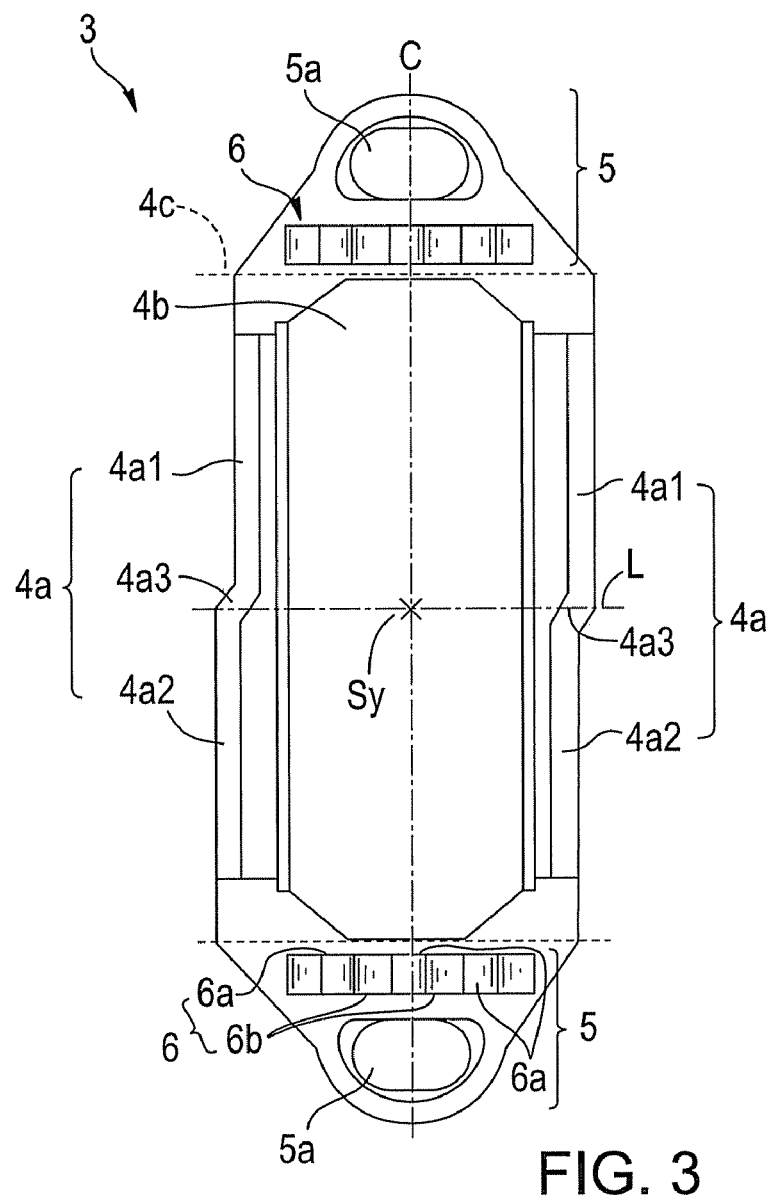
FIG. 3 is a plan view of one housing as viewed from the inner surface side.

FIG. 3 is a plan view of one housing 3 as viewed from the inner surface side. Two symmetric axes each defines a symmetric line of each of the flange portions 5 located on the both ends (upper and lower ends in FIG. 3) of the housing 3. A center axis line C of the housing body 4 is defined by a straight line which passes these symmetric axes. The reason is that, in the embodiment of the present invention, since the housing type pipe joint is composed of two housings 3 that have substantially the same shape, if the symmetric axes of both the flange portions 5 do not extend on the same line, the flange portions 5 will be offset from each other when the pair of housings 3 are opposed to each other.

A symmetric axes through which the flange portions 5 located on the upper and lower ends are reflected onto each other is referred to as a pipe-axial direction L. The pipe-axial direction L is perpendicular to the center axis line C. Also, the pipe-axial direction L is generally in parallel to the axial direction of the pipes when the housing type pipe joint 1 is attached to the pipes.

In addition, the intersection between the center axis line C and the pipe-axial direction L is referred to as a symmetric point Sy of the housing. Thus, when the housing 3 is rotated at 180 degrees about the symmetric point Sy, the rotated housing 3 matches the original housing 3.

The pawl portions 4a are located in parallel to each other on the both side edges of an inner surface 4b of the housing body 4. One stepped section 4a3 is formed in the central part of the pawl portion 4a between one end side (the upper end side in FIG. 3) and the other end side (the lower end side). An upper section of the pawl portion 4a located on the upper side relative to the stepped section 4a3 is referred to as an upper pawl section 4a1, and a lower section of the pawl portion 4a located on the lower side relative to the stepped section 4a3 is referred to as a lower pawl section 4a2.

Here, as seen from the pawl portion 4a on the left side in FIG. 3, both the upper and lower pawl sections 4a1 and 4a2 are parallel to the center axis line C, but the lower pawl section 4a2 is shifted away from the center axis line C at the stepped section 4a3, and the lower pawl section 4a2 is offset leftward from the upper pawl section 4a1. Thus, as a whole, the pawl portion 4a angles diagonally relative to the center axis line C and away from the line C, from the upper end towards the lower end of the pawl portion 4a.

Also, the pawl portion 4a on the right side in FIG. 3 is parallel to the pawl portion 4a on the left side. So, as a whole, the pawl portion angles diagonally relative to the center axis line C and closer to the line C, from the upper end towards the lower end of the pawl portion 4a. Specifically, both the upper and lower pawl sections 4a1 and 4a2 of the pawl portion 4a on the right side are parallel to the center axis line C, but the upper pawl section 4a1 is shifted away from the center axis line C at the stepped section 4a3, and the upper pawl section 4a1 is offset rightward from the lower pawl section 4a2.

The flange portions 5 extend radially outward from both ends 4c of the housing body 4. Also, each of the inner surfaces (opposed surface) of the flange portions 5 is provided with a positioning member (fixing portion) 6 with two or more of concave sections 6b and convex sections 6a alternately arranged along each of the both ends 4c. In addition, each of parts of the flange portions 5 outside from the positioning members 6 is provided with an elongated circular hole 5a that centers a point on the center axis line C, and extends along each of the both ends 4c.

Figure 4:
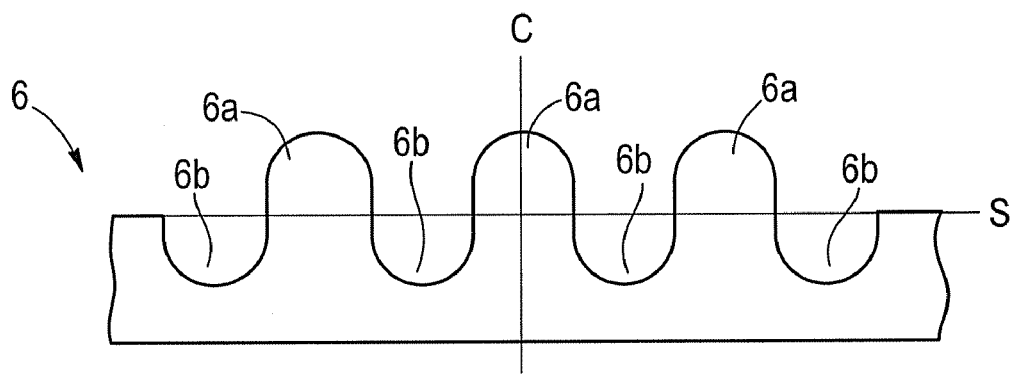
FIG. 4 is a view showing the configuration of a side surface of a positioning member.

FIG. 4 shows the configuration of a side surface of the positioning member 6. The positioning member 6 includes two concave sections 6b each of which is arranged between two of three convex sections 6a. The concave sections 6b and the convex sections 6a are alternately arranged, and are arranged at a constant pitch (equidistantly). Also, in this embodiment, the positioning member 6 is embedded in the flange portion 5 so that middle height parts of the concave and convex sections 6b and 6a are coplanar with an inner surface S of the flange portion 5. Also, concave sections are provided outside the convex sections on the both ends of the positioning member 6 to accommodate parts of the convex sections on the both ends of the opposed positioning member 6 that protrude from the inner surface S of the opposed positioning member 6. In this case, when the concave and convex sections 6b and 6a of two positioning members 6 opposed to each other as discussed later mesh with and engage with mutually, both the inner surface S of the opposed flange portions 5 come in contact with each other.

In addition, the positioning member 6 has a symmetrical shape with respect to the center axis line C.

With reference to FIG. 5, the positional relationship of the positioning members 6x and 6y opposed to each other is now described when the housing is rotated about the symmetric point Sy.

Figure 5A:
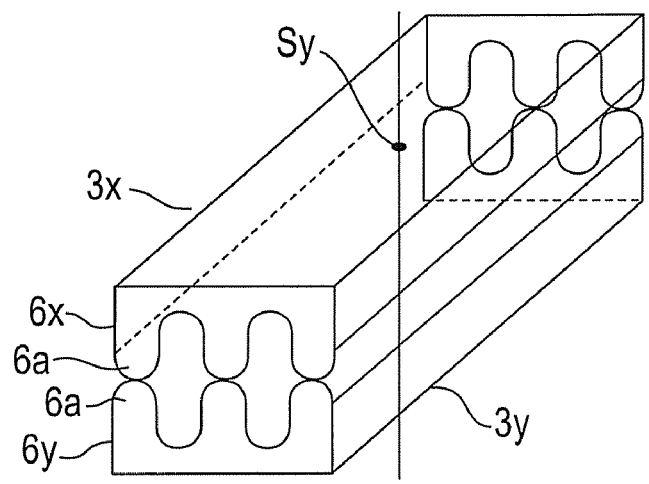
FIG. 5 is a view showing the positional relationship of the positioning members opposed to each other when the housing is rotated about its symmetric point.

First, when a pair of housings 3x and 3y are opposed to and overlap each other, the convex sections 6a of the positioning members 6x and 6y arranged in the housing 3x and 3y respectively come in contact with each other (FIG. 5(a)). The angle between the housings 3x and 3y on the upper and lower locations in this case is defined as 0 degree (initial position).

Figure 5B:
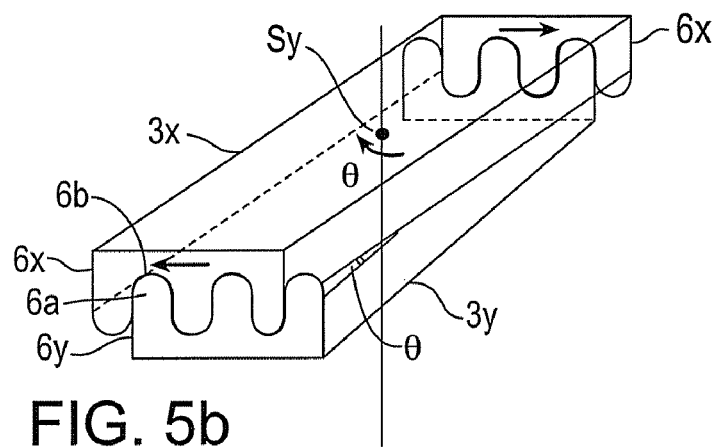

Next, one (upper) housing 3x is relatively rotated in a right-handed direction (clockwise direction) on a plane of the opposed surface about the symmetric point Sy of the housing (FIG. 5(b)). At this time, the position of the positioning member 6x is shifted by one pitch relative to the positioning member 6y, and the convex sections 6a of the positioning member 6y are fitted in the concave sections 6b of the positioning member 6x. So, the positioning members 6x and 6y engage with each other to position the housings 3x and 3y. The relative position of the positioning member 6x relative to the positioning member 6y in this case is referred to as a "first position", and the rotational angle of the positioning member 6x from the initial position (rotational angle 0 degree) shown in FIG. 5(a) is defined as Θ.

Figure 5C:
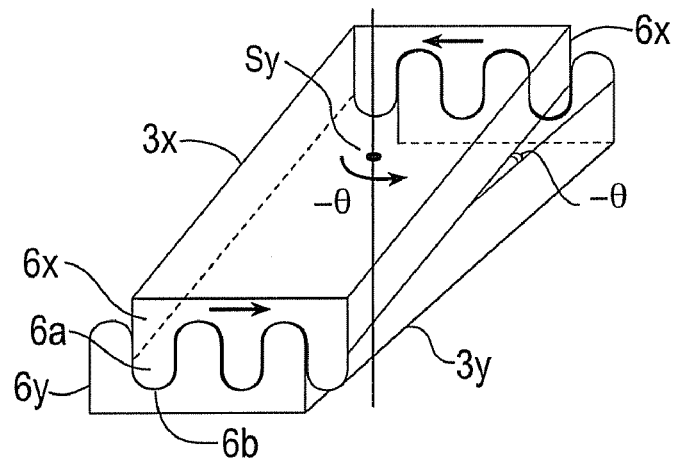

Next, one (upper) housing 3x is relatively rotated in a left-handed direction (counterclockwise direction) on the plane of the opposed surface about the symmetric point Sy of the housing (FIG. 5(c)). At this time, the position of the positioning member 6x is shifted in the opposite direction by one pitch relative to the positioning member 6y, and the convex sections 6a of the positioning member 6x are fitted in the concave sections 6b of the positioning member 6y. So, the positioning members 6x and 6y engage with each other to position the housings 3x and 3y. The relative position of the positioning member 6x relative to the positioning member 6y in this case is referred to as a "second position", and the rotational angle of the positioning member 6x from the initial position (rotational angle 0 degree) shown in FIG. 5(a) is defined as −Θ.

With reference to FIG. 6, the positional relationship of fitting portions (pawl portions) 4ax and 4ay opposed to each other is now described when the housing is rotated at the aforementioned angles Θ and −Θ about the symmetric point Sy.

Figure 6A:
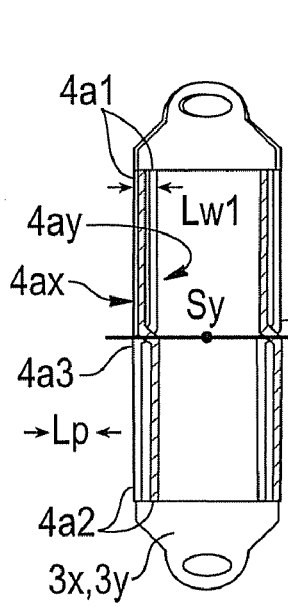
FIG. 6 is a view showing the positional relationship of fitting portions opposed to each other when the housing is rotated about its symmetric point.

First, at the initial position wherein the pair of housings 3x and 3y are opposed to and match each other, the pawl portions 4ax and 4ay located in the housing 3x and 3y respectively are opposed to each other (FIG. 6(a)). Note that the pawl portions 4ax of the housing 3x are shown as hatched parts in FIG. 6. In this position, the upper pawl section 4a1 of the pawl portion 4ax is located on the left side in parallel to the upper pawl section 4a1 of the pawl portion 4ay, and the lower pawl section 4a2 of the pawl portion 4ax is located on the right side in parallel to the lower pawl section 4a2 of the pawl portion 4ay so that these pawl portion intersect mutually at the stepped sections 4a3.

In this position, a distance Lw1 between the pawl portions 4ax and 4ay in the pipe-axial direction L is smaller than a width Lp, where Lp is the width of the groove (attachment portion) Pa of the pipe P in the pipe-axial direction L. Note that the "distance" between the pawl portions (fitting portions) refers to the length of a part formed by the fitting portions that extends at the widest interval in the pipe-axial direction L.

Figure 6B:
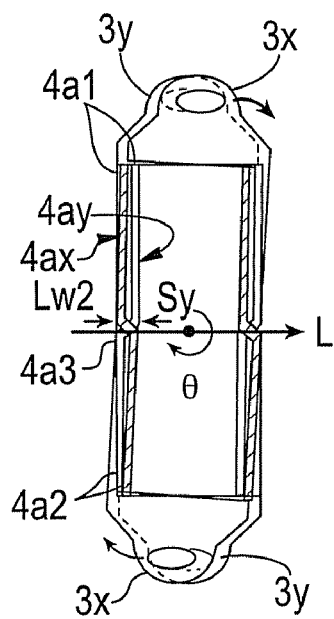

Next, when the housing 3x is rotated to the first position (rotational angle Θ), the upper pawl section 4a1 of the pawl portion 4ax moves rightward to approach (overlap) the upper pawl section 4a1 of the pawl portion 4ay, and the lower pawl section 4a2 of the pawl portion 4ax also moves leftward to approach (overlap) the lower pawl section 4a2 of the pawl portion 4ay (FIG. 6(b)). In this case, a distance Lw2 between the pawl portions 4*ax* and 4*ay* in the pipe-axial direction L is the closest, i.e., the smallest. Specifically, a distance Lw2 is the largest at the stepped sections 4*a*3, and is the smallest at the ends of the pawl portions 4*ax* and 4*ay*.

In this case, the relationship between Lp and Lw2 is indicated as Lp >Lw2, and the pawl portions (fitting portions) 4*ax* and 4*ay* are loosely fitted in the groove (attachment portion) Pa of the Pipe P. Thus, the pair of pipes P will be movably coupled to the pair of housings 3*x* and 3*y*.

Next, when the housing 3*x* is rotated in the opposite direction to the second position (rotational angle −Θ), the upper pawl section 4*a*1 of the pawl portion 4*ax* moves leftward away from the upper pawl section 4*a*1 of the pawl portion 4*ay*, and the lower pawl section 4*a*2 of the pawl portion 4*ax* also moves rightward away from the lower pawl section 4*a*2 of the pawl portion 4*ay*. In this case, a distance Lw3 between the pawl portions 4*ax* and 4*ay* in proximity to the ends of the pawl portions in the pipe-axial direction L is the furthest, i.e., the largest.

In this case, the relationship between Lp and Lw3 is provided by Lp ≦Lw3, and the pawl portions (fitting portions) 4*ax* and 4*ay* are firmly and tightly fit with sidewalls of the groove (attachment portion) Pa of the Pipe P. Thus, the pair of pipes P will be fixedly coupled to the pair of housings 3*x* and 3*y*.

In the first embodiment, the positioning member is disposed which engage with the other of the positioning member at the first or second position to locate the housings mutually when the pair of housings are rotated about the symmetric point of the housings. In addition, the fitting portions are provided each includes the stepped section that angles diagonally relative to the center axis line from one end of the fitting portion, toward the other end of the fitting portion, and the fitting portions fit with the attachment portions of the pipes.

Thus, the distance between the fitting portions and the other of the fitting portions opposed each other in the pipe-axial direction can be varied only by rotating the housing. Accordingly, when rotating the housing to reduce this distance, the fitting portions can be loosely fitted in the grooves (attachment portions) of the pipes so that the pair of pipes can be movably coupled to the pair of housings. On the other hand, when the housing is rotated to increase this distance, the fitting portions can be firmly fitted in and tightly fit with the side walls of the grooves (attachment portions) of the pipes so that the pair of pipes can be fixedly coupled to the pair of housings. In other words, the present invention can meet both connecting methods of the fixed and movable pipe connecting by one type of housing itself without an additional member required depending on the types of connecting methods. Thus, the present invention has excellent workmanship efficiency and the number of the components can be reduced.

Also, in the case of the fitting portions are formed to extend diagonally relative to the center axis line of the housing body, when the housings are opposed to each other, the fitting portions and the other of the fitting portions which opposed to each other intersect mutually so that the ends of the fitting portions opposed to each other already and slightly open and are spaced away from each other. For this reason, the distance between the ends of both the fitting portions in the pipe-axial direction can be large by rotating the housing at a relatively small angle. Thus, the fitting portions can easily tightly fit with the sidewalls of the attachment portions of the pipes to provide the fixed connecting.

In contrast, when the fitting portions are formed in parallel to the center axis line of the housing body, even when the housings are rotated at the same rotational angle in the opposite directions a width Lw in the pipe-axial direction L is the same irrespective of the rotational directions. For this reason, connecting methods cannot be switched according to the rotational directions (in other words, the both rotational directions make the pipes fixedly connected). Even in this case, if rotational angles are different in the forward and reverse directions, it is possible to switch connecting methods of the fixed and movable pipe connecting. However, the contact state and the area of a contact part between the pipe and the fitting portion vary according to the rotational angle. So, when the rotational angles are different, the fitting tightness of the pipe is not uniform. For this reason, to equal the rotational angles in the forward and the reverse directions, the fitting portions are located to extend diagonally relative to the center axis line of the housing body as the present invention.

In the first embodiment, when a pair of housings opposed to each other is not rotated about their symmetric point but one of the housing is offset in the pipe-axial direction, it is also possible to vary the distance between fitting portions opposed to each other in the pipe-axial direction. However, in this case, deviation of the housings will be large, and the fitting tightness of the pipe is likely to be uneven, and the weight balance of the housings is likely to deteriorate. For this reason, in the present invention, the housing is rotated about the symmetric point.

Also, in the first embodiment, the positioning member 6 includes two or more of concave sections 6*b* and convex sections 6*a* alternately and equidistantly arranged along each of the both ends 4*c* of the housing body 4.

In this embodiment, when the positioning members 6 are opposed to and engage with each other, both the positioning members 6 in upper and lower locations mesh with each other. Thus, the positioning members 6 can have the same shape. On the contrary, for example, if positioning members in the both ends of an upper housing are composed of a pin and positioning members in the both ends of a lower housing are composed of two holes, the positioning members can engage with each other at the first or second position by inserting the pins into the holes. However, in such positioning members, different structures of pins and holes are required. Accordingly, connecting methods using only one type of common housing cannot be achieved. This causes increase of the number of components and reduction of workmanship efficiency.

In addition, when the positioning members have the same shape, since both the housings are symmetric with respect to the symmetric point, arrangement orientation of the housings 3 is not complicated when the pair of housings 3 is oppositely placed. Accordingly, problems such as improper attachment in which the housings are attached in a wrong orientation can be eliminated.

Figure 7:
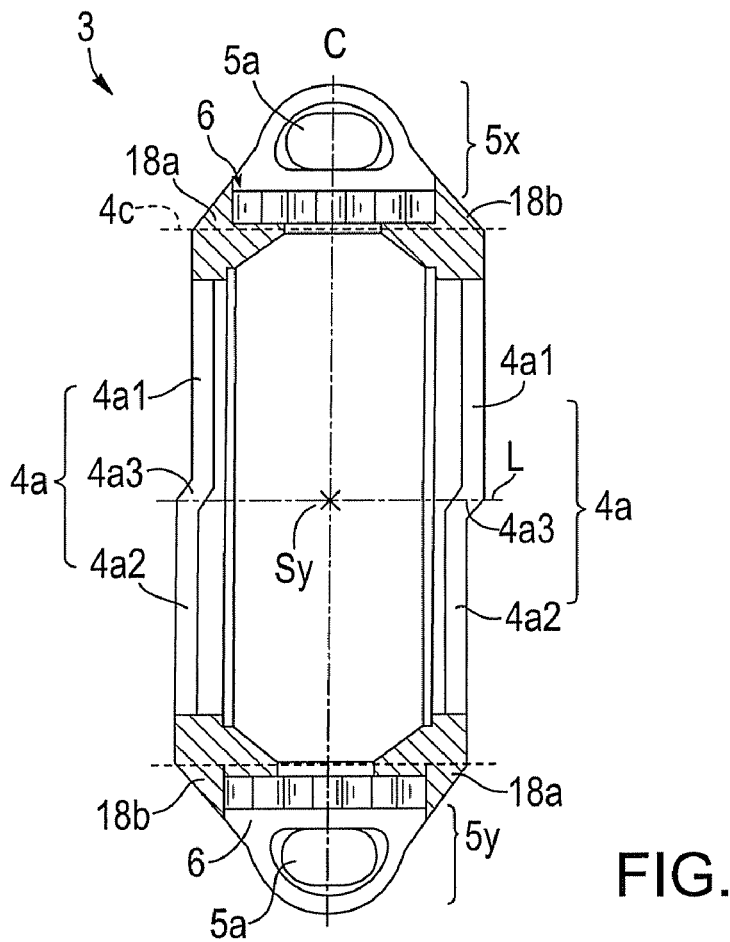
FIG. 7 is a plan view showing a color pattern of the inner surfaces (opposed surfaces) of flange portions of one housing as viewed from the inner surface side.

FIG. 7 is a plan view showing a color pattern of the inner surfaces (opposed surfaces) of the flange portions 5*x* and 5*y* of one housing 3 as viewed from the inner surface side. A first-colored area 18*a* is provided on a left-side peripheral part of the inner surface of the upper flange portion 5*x*. In addition, similarly, a first-colored area 18*a* is also provided on a right-side peripheral part of the lower flange portion 5*y* inner surface symmetrical to the left-side peripheral part with respect to the symmetric point Sy.

On the other hand, a second-colored area 18*b* is provided on a right-side peripheral part of the inner surface of the upper flange portion 5*x*. In addition, similarly, a second-colored area 18*b* is also provided on a left-side peripheral part of the lower flange portion 5*y* inner surface symmetrical to the right-side peripheral part with respect to the symmetric point Sy.

In this embodiment, when the housing 3*x* is rotated to the first position (at rotational angle Θ) shown in FIG. 6(*b*), the left-side peripheral part of the upper part flange portion 5*x* inner surface and the right-side peripheral part of the lower flange portion 5y inner surface are exposed, and the first-colored areas 18a on the peripheral parts become visible. Accordingly, it can be easily confirmed that the housing is rotated to the first position (at rotational angle −Θ). As a result, mistakes such as accidental fixed connecting when the pipes are required to be movably coupled can be prevented, for example.

Figure 6C:
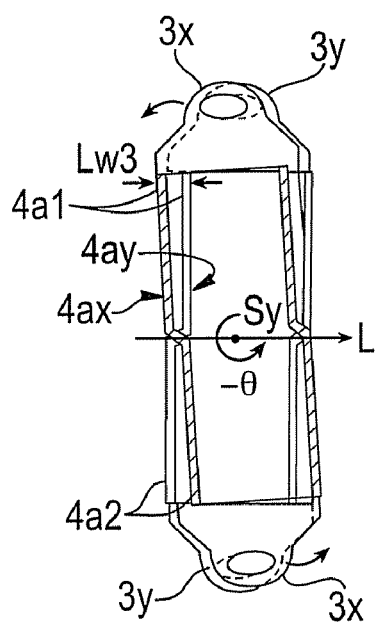

Also, when the housing 3x is rotated to the second position (at rotational angle −Θ) shown in FIG. 6(c), the right-side peripheral part of the upper part flange portion 5x inner surface and the left-side peripheral part of the lower flange portion 5y inner surface are exposed, and the second-colored areas 18b on the peripheral parts become visible. Accordingly, it can be easily confirmed that the housing is rotated to the second position (at rotational angle −Θ). As a result, similar to the above case, accidental fixed connecting can be prevented.

Figure 8:
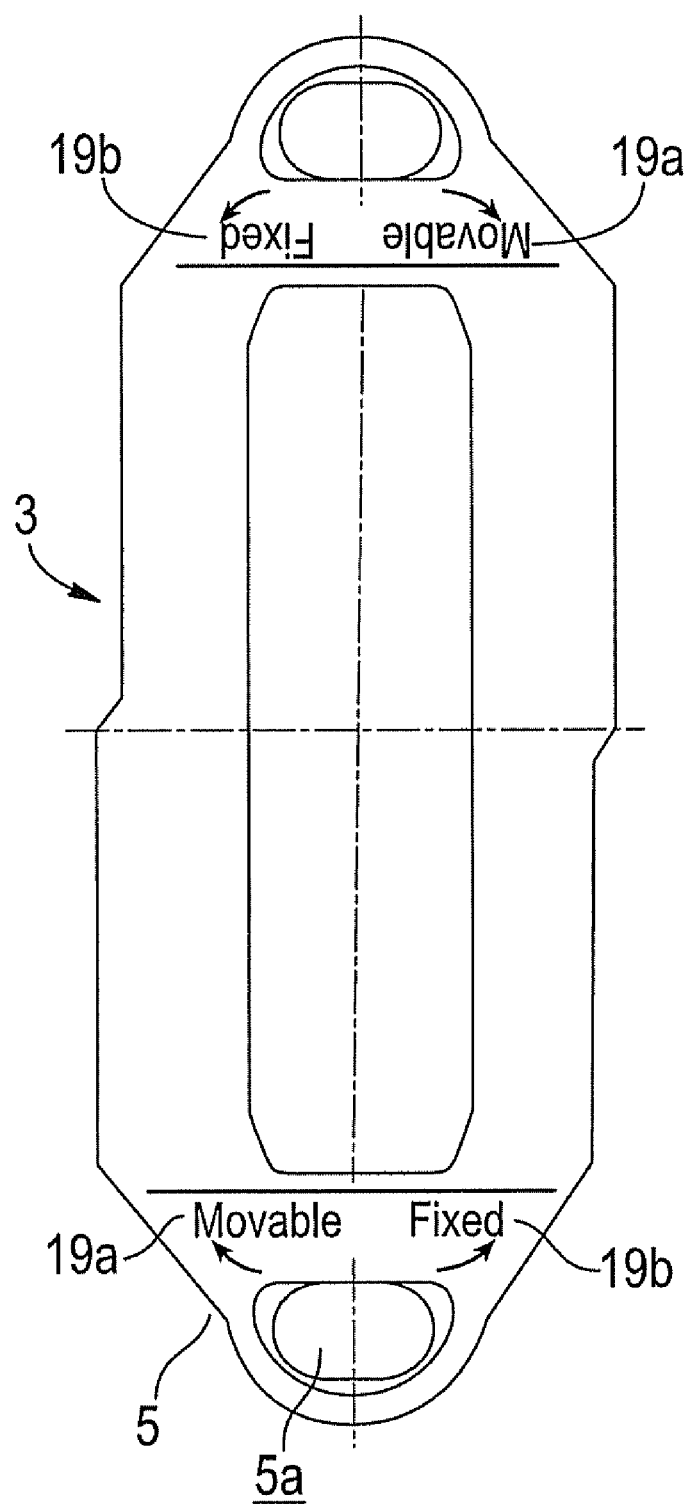
FIG. 8 is a plan view of one housing as viewed from the exterior surface side.

FIG. 8 is a plan view of one housing 3 as viewed from the exterior side. In this Figure, an indication part(e.g., an arrow and wording "Movable") 19a is arranged in and protrudes from a part of the flange portion 5 inside the bolt hole 5a to indicate a rotational direction toward the first position. An indication part (e.g., an arrow and wondering "Fixed") 19b is similarly arranged and protrudes to indicate a rotational direction toward the second position.

In this embodiment, before rotating the housing 3x, a worker can visually know which direction to rotate the housing. As a result, mistakes such as accidental fixed connecting when the pipes are required to be movably coupled can be prevented.

Figure 9:
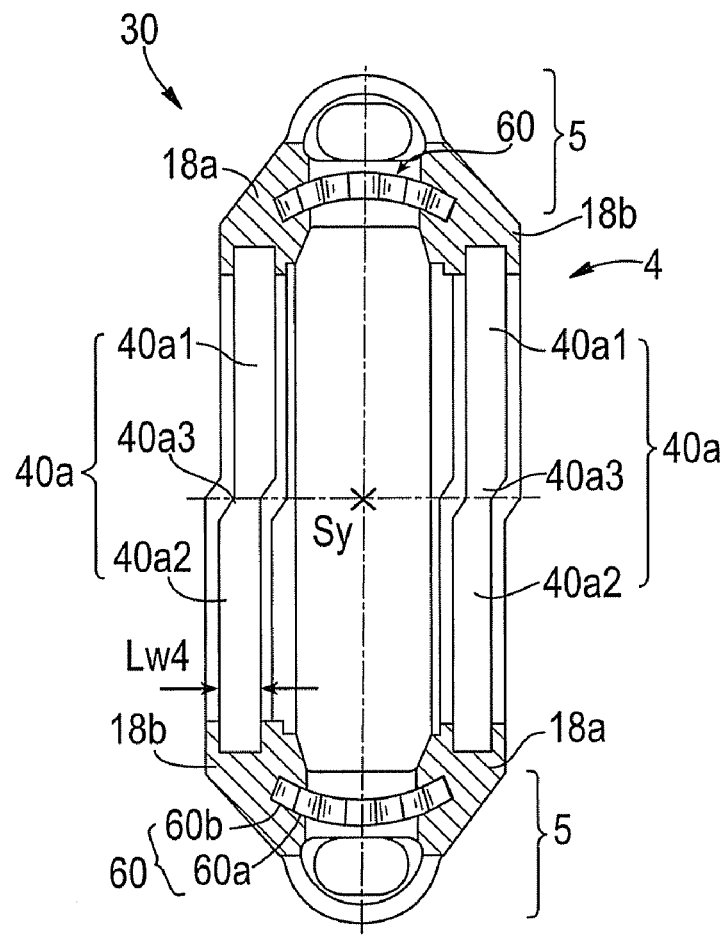
FIG. 9 is a plan view of one housing that composes the housing type pipe joint according to a second embodiment as viewed from the inner surface side.

A housing type pipe joint according to a second embodiment of the present invention is now described. FIG. 9 is a plan view of one housing 30 that composes the housing type pipe joint according to the second embodiment as viewed from the inner surface side. The housing type pipe joint according to the second embodiment is the same as the housing type pipe joint according to the first embodiment except that fitting portions 40a and positioning members 60 are configured differently from the first embodiment. Components the same as those of the housing type pipe joint according to the first embodiment are attached with the same reference numerals in FIG. 3, and their description is omitted.

In FIG. 9, the fitting portions 40a are recessed outward of the housing from the housing body 40 on the periphery of the fitting portions 40a. On the other hand, instead of grooves, though not illustrated, ring-shaped convex portions (attachment portions) are formed in the ends of pipes. The convex portions are accommodated in and fit with the fitting portions 40a that are sectionally rectangular grooves. In addition, the width Lw4 of the fitting portion 40a in the pipe-axial direction L is wider than the width of the convex portion (attachment portion) of the pipe (not shown).

Also, similarly to the pawl portion shown in FIG. 3, as seen from the fitting portion 40a (peripheral edges) on the left side in FIG. 9, both upper and lower engaging sections 40a1 and 40a2 are parallel to the center axis line C, but the lower engaging section 40a2 is shifted away from the center axis line C at a stepped section 40a3 and is offset leftward from the upper engaging section 40a1. Thus, as a whole, the fitting portion 40a angles diagonally relative to the center axis line C and away from the line C, from the upper end towards the lower end of the fitting portion 40a.

Also, in the second embodiment, first and second-colored areas 18a and 18b are provided similarly to the first embodiment.

In contrast, the fitting portion 40a on the right side in FIG. 9 is parallel to the fitting portion 40a on the left side. So, as a whole, the fitting portion angles diagonally relative to the center axis line C and closer to the line C, from the upper end towards the lower end of the fitting portion. Specifically, both the upper and lower engaging sections 40a1 and 40a2 of the fitting portion 40a on the right side are parallel to the center axis line C, but the upper engaging section 40a1 is shifted away from the center axis line C at the stepped section 40a3, and the upper engaging section 40a1 is offset rightward from the lower engaging section 40a2.

Accordingly, similar to the case of the first embodiment, when a pair of housings opposed to each other is rotated about the symmetric point, this rotation varies the distance between the peripheral edges of the fitting portions 40a opposed to each other in the pipe-axial direction L. Thus, if the distance between the peripheral edges of the fitting portions 40a becomes short, the convex portion (attachment portion) of the pipe is movable in the fitting portions 40a in the upper and lower locations. As a result, the convex portions (attachment portion) of the pipes P are loosely fitted in the fitting portions 40a, and the pair of pipes can be movably coupled to the pair of housings.

On the other hand, when the housing is rotated so that the distance between the peripheral edges of the fitting portions 40a becomes increased (that is, when the fitting portions 40a opposed to each other are moved away from each other in the pipe-axial direction L), the convex portion (attachment portions) of the pipe is caught between the side walls of the fitting portions 40a (opposed to each other) in upper and lower locations, and the pipes are firmly fixed so that movement of the pipes is restricted. As a result, the convex portions (attachment portion) of the pipes P are tightly fit with the fitting portions 40a, and the pair of pipes can be fixedly coupled to the pair of housings.

In addition, although the positioning member 60 in the second embodiment includes two or more concave sections 60b and convex sections 60a arranged alternately and at a constant pitch (equidistantly) similarly to the first embodiment, the concave portions 60b and convex portions 60a are arranged not on a straight line but along an arc line that centers the symmetric point Sy of the housing.

In this embodiment, when the housings are opposed to each other so that the positioning members 60 are opposed to each other to allow the concave and convex sections of the positioning members 60 to mesh with each other, the housing is necessarily rotated along the arrangement direction of the concave and convex sections, in other words, about the symmetric point Sy of the housing. Even if one of the housings is displaced in the pipe-axial direction L, the concave and convex sections of the positioning members 60 do not mesh with each other. That is, a improper work such as improper attachment where the housings are displaced in the pipe-axial direction L can be prevented.

Figure 10:
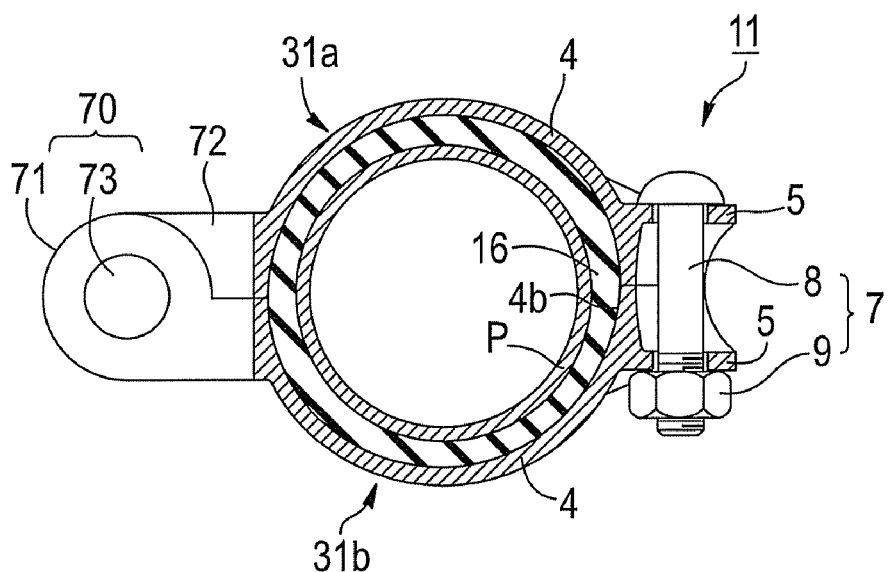
FIG. 10 is a cross-sectional view of a housing type pipe joint according to a third embodiment taken along a plane perpendicular to the axial direction of pipes.

A housing type pipe joint 11 according to a third embodiment of the present invention is now described. FIG. 10 is a cross-sectional view of the housing type pipe joint 11 according to the third embodiment with being attached to pipes taken along a plane perpendicular to the axial direction of the pipes. The housing type pipe joint 11 according to the third embodiment is the same as the housing type pipe joint according to the first embodiment except that one of the both ends of the housing body 4 is not provided with the flange portion but having a hinge 70 instead of the flange portion. Components the same as those of the housing type pipe joint according to the first embodiment are attached with the same reference numerals in FIG. 1, and their description is omitted.

The housing type pipe joint 11 includes a pair of housings 31a and 31b coupled to each other. Each of the housings 31a and 31b include generally-semicircular housing body 4, and a flange portion 5 that extend on one of the both ends of the housing body 4 radially outward, and the hinge 70 coupled to the other end of the housing body 4. In this embodiment, the hinge 70 includes a tongue-shaped hinge base portion 72 coupled to the other end of the upper housing 31a to extend on the center axis line C, a pair of circular shaft support portions 71 that interpose the hinge base portion 72, a bolt 73 inserted into holes that penetrate the shaft support portions 71 and the hinge base portion 72 in the pipe-axial direction L, and a nut 74. The base end of each shaft support portion 71 is coupled to the other end of the lower housing 31b. The hinge base portion 72 pivots about the bolt 73 as a pivot center relative to the shaft support portions 71. Thus, the upper housing 31a opens relative to the lower housing 31b so that the pipe P can be inserted/removed.

In addition, in the third embodiment, the "fasteners" include the bolt 8 and nut 9 that fasten the flange portions 5, and the hinge 70. Among them, the hinge 70 is included in the housing type pipe joint as a constituent element.

Figure 11:
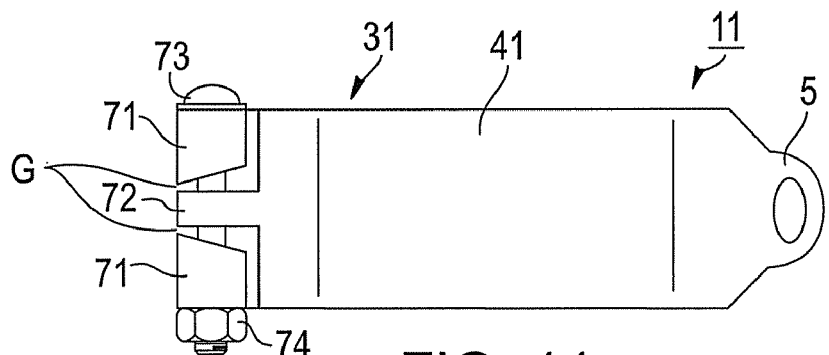
FIG. 11 is a top view of the housing type pipe joint according to the third embodiment.
Figure 12:
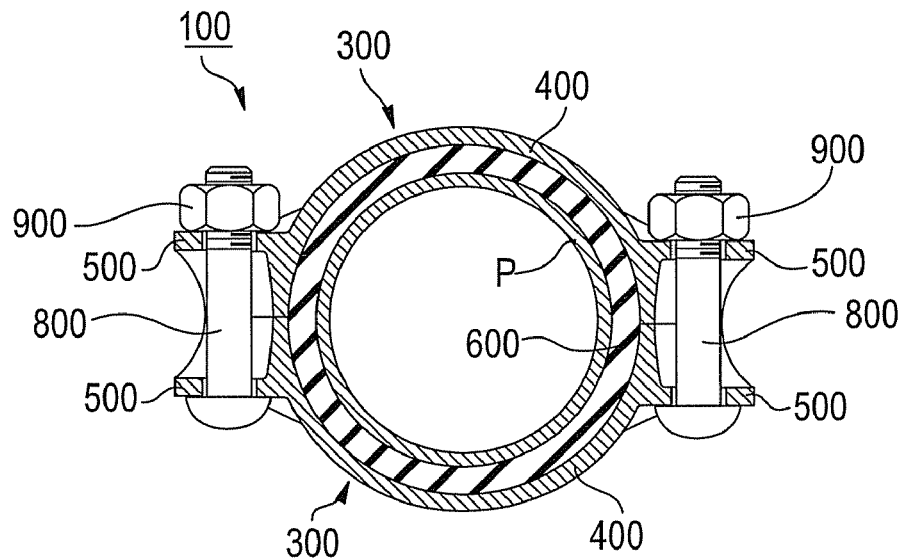
FIG. 12 is a cross-sectional view of a conventional housing type pipe joint taken along a plane perpendicular to the axial direction of pipes.
Figure 13:
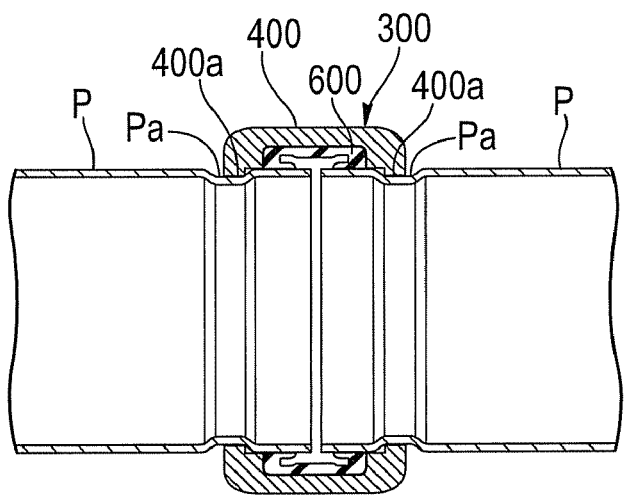
FIG. 13 is a cross-sectional view of a conventional housing type pipe joint taken along a plane parallel to the axial direction of pipes.

FIG. 11 is a top view of the housing type pipe joint 11 according to the third embodiment. Certain gaps G are provided between the shaft support portions 71 and the hinge base portion 72. The gaps G allow the housings 31a and 31b to rotate in the aforementioned manner as shown in FIG. 6. In other words, play is provided between the hinge base portion 72 and each of the shaft support portions 71 to rotate the housings and shift the housings towards each other. In addition, in the case of the third embodiment, since the one end of each of the housings 31a and 31b is coupled to the hinge 70, the positioning member 6 is required only on the inner surface of each of the flange portions 5.

According to the third embodiment, since the housings 31a and 31b are coupled to the hinge 70, it is not necessary to pick up a pair of housings, and one of the housings cannot be lost while at work, therefore, workmanship efficiency is improved.

According to the third embodiment, since the housings 31a and 31b are coupled to the hinge 70, it is not necessary to pick up a pair of housing, and one of the housings cannot be lost while at work, therefore, workmanship efficiency is improved.

Needless to say, the present invention is not limited to the foregoing embodiments, and various modifications and equivalents fall within the spirit and the scope of the present invention.

In the foregoing embodiments, although the fitting portion is used that includes one stepped section formed at a part between one end and the other end of the fitting portion so that, as a whole, the fitting portion extends diagonally relative to the center axis line. A fitting portion may include a plurality of stepped sections, or fitting portions may be provided that do not include a stepped portion but have a straight shape that extends diagonally relative to the center axis line, for example.

What is claimed is:

1. A housing pipe joint for connecting a pair of pipes that include attachment portions on the pipe end, the housing type pipe joint comprising:
   a pair of housings, each of which includes
      a semicircular housing body,
      a flange portion located on at least an end of the housing body to extend radially outward,
      fitting portions located in parallel to each other on an inner surface of each of the housing bodies adapted to fit with the attachment portions of the pipes, each of the fitting portions extending diagonally relative to a center axis line of the housing body or including at least one stepped section that angles diagonally relative to the center axis line from one end of the fitting portion toward the other end of the fitting portion, and
      a positioning member on each housing body arranged on opposed surfaces of each flange portion wherein the opposed surface faces toward the other of the flange portion when the pair of housings are opposed to each other, the positioning member engaging with the other of the positioning member to position the pair of housings mutually at a first position when one of the pair of housings is rotated on a plane of the opposed surface about a symmetric point of the housing or at a second position when the housing is rotated in a direction opposite to the first position;
   wherein the pair of housings is adapted to surround and secure a connecting part of the pair of pipes when the positioning member of one housing body engages with the other of the positioning member of the other housing body; and
   when the positioning member engages with the other of the positioning member at the first position, the distance between the fitting portions and the other of the fitting portions opposed to each other is the closest the distance can be in a pipe axial direction perpendicular to the center axis line of the housing body so that the fitting portions are adapted to loosely fit in the attachment portions and the pair of pipes are movably connected to the pair of housings; and
   when the positioning member engages with the other of the positioning member at the second position, the distance between the fitting portions and the other of the fitting portions opposed to each other is the largest the distance can be in the pipe axial direction so that the fitting portions are adapted to tightly fit with the attachment portions and the pair of pipes are fixedly coupled to the pair of housings,
   wherein the positioning member includes two or more concave sections and convex sections alternately arranged and equidistantly spaced along the end of the housing body.

2. The housing pipe joint according to claim 1, further comprising a first colored area on a part of the opposed surface of the flange portion, wherein the first colored area is exposed when the positioning member engages with the other of the positioning member at the first position.

3. The housing pipe joint according to claim 2, further comprising a second colored area on a part of the opposed surface of the flange portion, wherein the second colored area is exposed when the positioning member engages with the other of the positioning member at the second position.

4. The housing pipe joint according to claim 3, further comprising an indication part on an exterior surface of each of the housings, wherein the indication part indicates a rotational direction toward the first position, the second position, or both the first and second position.

5. The housing pipe joint according to claim 2, further comprising a second colored area on the part of the opposed surface of the flange portion, wherein the part is exposed when the positioning member engages with the other of the positioning member at the second position.

6. The housing pipe joint according to claim 2, further comprising an indication part on an exterior surface of each of the housings, wherein the indication part indicates a rotational direction toward the first position, the second position, or both the first and second position.

7. The housing pipe joint according to claim 1, further comprising an indication part on an exterior surface of each of the housings, wherein the indication part indicates a rotational direction toward the first position, the second position, or both the first and second position.

8. A housing pipe joint for connecting a pair of pipes that include concave or convex attachment portions on the pipe end, the housing type pipe joint comprising:
- a pair of housings, each of which includes
  - a semicircular housing body,
  - a flange portion located on at least an end of the housing body to extend radially outward,
  - fitting portions located in parallel to each other on an inner surface of each of the housing bodies adapted to fit with the attachment portions of the pipes, each of the fitting portions extending diagonally relative to a center axis line of the housing body or including at least one stepped section that angles diagonally relative to the center axis line from one end of the fitting portion toward the other end of the fitting portion, and
  - a positioning member on each housing body arranged on opposed surfaces of each flange portion wherein the opposed surface faces toward the other of the flange portion when the pair of housings are opposed to each other, the positioning member engaging with the other of the positioning member to position the pair of housings mutually at a first position when one of the pair of housings is rotated on a plane of the opposed surface about a symmetric point of the housing or at a second position when the housing is rotated in a direction opposite to the first position;
- wherein the pair of housings is adapted to surround and secure a connecting part of the pair of pipes when the positioning member of one housing body engages with the other of the positioning member of the other housing body and the flange portion and the other of the flange portion opposed to each other are adapted to being fastened by a fastener;
- when the positioning member engages with the other of the positioning member at the first position, the distance between the fitting portions and the other of the fitting portions opposed to each other is the closest the distance can be in a pipe axial direction perpendicular to the center axis line of the housing body so that the fitting portions are adapted to loosely fit in the attachment portions and the pair of pipes are movably connected to the pair of housings; and
- when the positioning member engages with the other of the positioning member at the second position, the distance between the fitting portions and the other of the fitting portions opposed to each other is the largest the distance can be in the pipe axial direction so that the fitting portions are adapted to tightly fit with the attachment portions and the pair of pipes are fixedly coupled to the pair of housings,
- wherein the positioning member includes two or more concave sections and convex sections alternately arranged and equidistantly spaced along the end of the housing body.

* * * * *